Feb. 27, 1968   F. F. HOHNHOLT   3,370,574
STEAM GENERATING APPARATUS

Filed Nov. 4, 1966   2 Sheets-Sheet 1

INVENTOR.
FRANK F. HOHNHOLT
BY
ATTORNEY

Feb. 27, 1968
F. F. HOHNHOLT
3,370,574
STEAM GENERATING APPARATUS
Filed Nov. 4, 1966
2 Sheets-Sheet 2
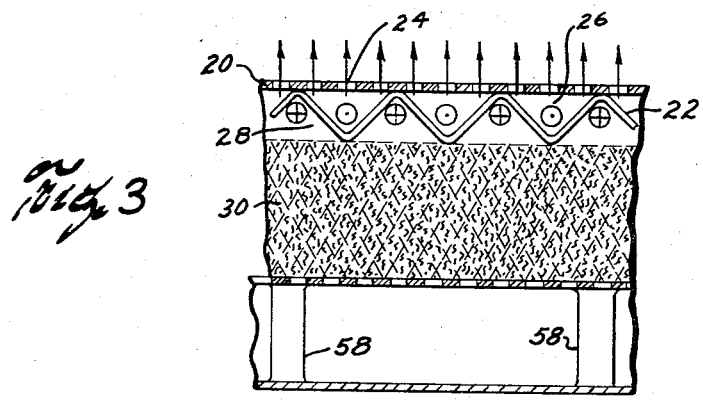
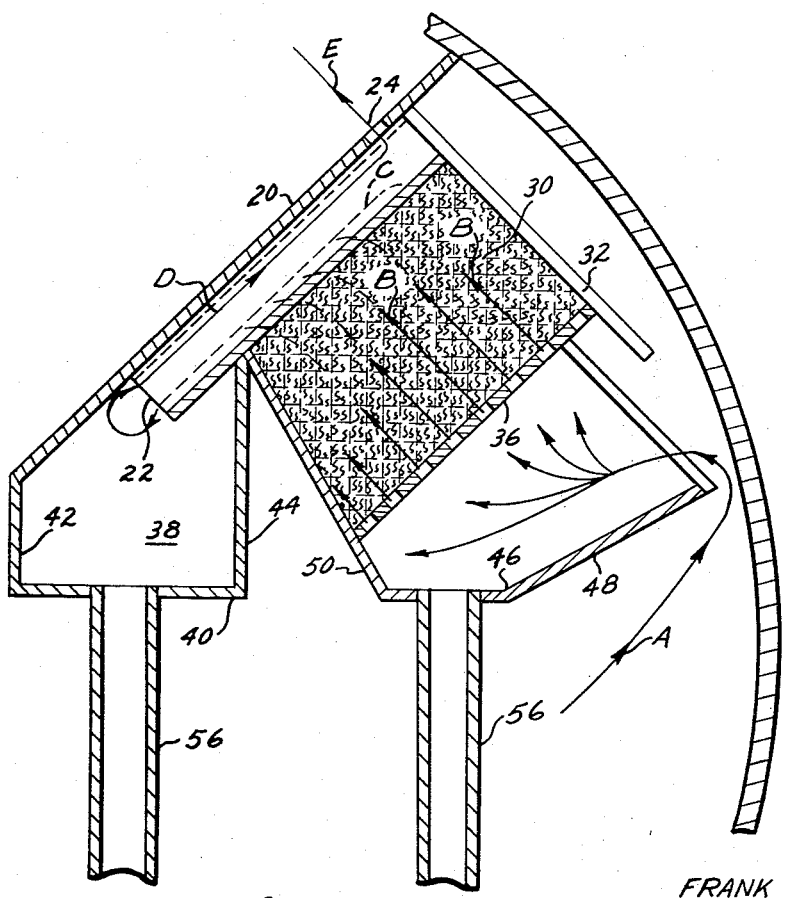
INVENTOR.
FRANK F. HOHNHOLT
BY
ATTORNEY

United States Patent Office 3,370,574
Patented Feb. 27, 1968

3,370,574
STEAM GENERATING APPARATUS
Frank F. Hohnholt, Upper Saddle River, N.J., assignor to Superior Combustion Industries, Inc.
Filed Nov. 4, 1966, Ser. No. 592,113
10 Claims. (Cl. 122—491)

This invention relates to steam generators and to the purification of steam generated in such apparatus. More particularly the invention provides novel means for removing entrained circulating water from the steam and for drying the steam. It also provides means for removing any solid material which may be carried along with the steam or with the entrained water. The invention is particularly useful but not limited to steam generators of the water tube type. In such generators there is usually provided a plurality of elongated steel water tubes joined together at their lower ends by a header or lower drum. Their upper ends are sealed pressure tight where they enter into an upper drum which is normally partly filled with water and with steam. The water tubes are contained within a fire box of a furnace wherein flames from the boiler fire and the heated gases resulting therefrom, flow over the outer surfaces of the water tubes so that the water therein is heated to steam. Since the upper drum is usually also placed within the furnace walls further heating of the water contained within the upper drum is accomplished and the generated steam is further heated. However, due to the large steaming capacity of modern boilers, there is a tendency for the boiler water to be entrained with the steam and pass out of the boiler into the steam line where it can cause difficulty with the equipment to which the steam is supplied. A general object of my invention therefore is the provision of simple and effective means for purifying and drying steam.

Further, a more specific object is the provision of steam drying means especially adapted for use in a boiler steam and water drum characterized by its effectiveness in operation at high steaming rates and high drum water levels.

A further object of the present invention is to separate or remove moisture from steam produced by a water tube boiler so that the carryover into the steam lines, in terms of solids which may be a constituent of the boiler water, are maintained within specified limits.

The foregoing objects and others which may appear from the following detailed description are attained in accordance with the principles of the present invention by providing a qualifier unit within the steam drum of a water tube boiler which causes multiple changes of steam flow direction as it flows through the qualifier and by additionally providing a vertically inclined section of stainless steel mesh filter assembly including a multiple orifice aperture plate or plates. Particles of water carried by the steam tend to be collected by the mesh filter and since this filter is disposed at an angle to the horizontal, the collected water tends to flow along the fibers of the filter in a direction other than parallel to the direction of the steam flow. This prevents the water from again being picked up by the steam as the steam flows through the filter. A trough is provided along the lower edge of the filter in which the collected water is gathered and this trough is provided with a plurality of drain lines extending below the normal water line of the boiler. After the steam has passed through the mesh filter it passes diagonally downward through a number of parallel passages and at the bottom of these passages the steam is caused to sharply change direction and pass upwardly along a plurality of inclined passages parallel to the first-mentioned passages. Thereafter, the steam again is caused to change its direction sharply and flow into a collecting chamber and from there to the steam outlet pipe. A collecting trough is provided at the bottom of the series of inclined passages to collect the water thrown off by the steam as it sharply changes direction from whence it is returned to below the normal water line of the boiler by a number of drain tubes terminating below such normal water line. A special feature of the arrangement thus described is that it may be notably small in overall size without loss of efficiency. Thus it can readily be used with steam drums as small as thirty-six inches in diameter. It is also characterized by its ability to efficiently remove moisture from the steam while at the same time only causing a low pressure drop across the unit.

The present invention will be more fully understood by reference to the following detailed description which is accompanied by a drawing in which:

FIG. 1 is a transverse vertical cross-section of a steam drum of a water tube boiler embodying principles of the present invention, while

FIG. 3 is a fragmentary inclined longitudinal cross-section taken along line 3—3 of FIG. 1, and FIG. 4 is a partial cross-section of a portion of the device of FIG. 1, shown as enlarged so that the steam path through the qualifier may be more readily followed.

Figure 1:
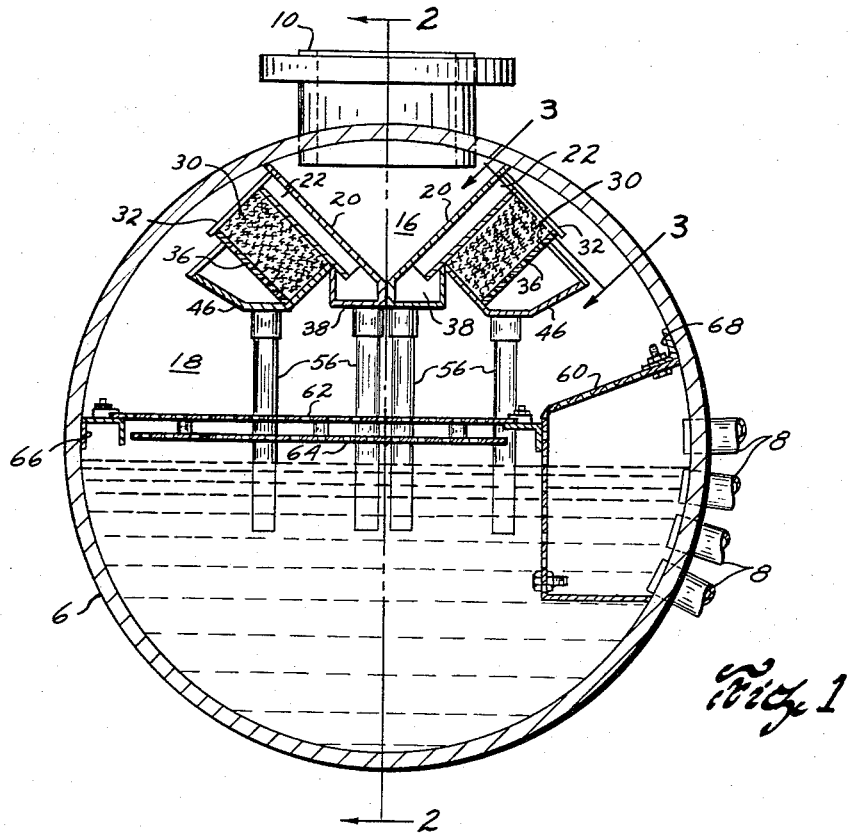

Referring first to FIG. 1, the boiler drum, indicated by reference numeral 6, is of the steam and water type into which extend a number of water tubes 8. Water tubes 8 are shown as only short segments but it will be readily understood by those skilled in the art that they are elongated and are so positioned in a generally parallel array within the walls of the furnace so as to be heated by the flames and heated gases within the furnace. Also it should be understood that all of the water tubes are connected together at their lower ends by a lower drum or header into which new feed water is introduced as the water within drum 6 and within water tubes 8 is changed to steam and withdrawn through steam outlet 10.

Figure 2:
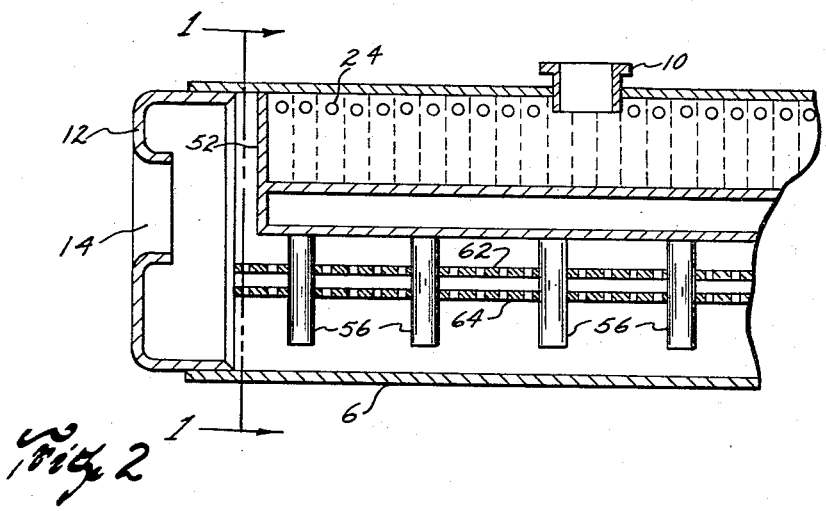
FIG. 2 is a fragmentary vertical longitudinal cross-section taken along line 2—2 of FIG. 1.

As shown more clearly in FIG. 2, the ends of steam drum 6 are closed by headers one of which is shown at 12, hermetically welded or riveted in place. Header 12 is preferably provided with a relatively large access hole or manhole 14 which when the boiler is in use is covered at its inside end with a manhole cover clamped into place from the outside. The manhole cover and its clamping means are not shown. Boiler drum 6 is essentially divided into a main or dry steam chamber 16 and a mixed water and steam chamber 18 by a pair of plates 20, 20 running essentially the entire length of the drum and inclined approximately 45° from the vertical. Since the right and left halves of the steam qualifier as shown in FIG. 1 are essentially mirror images of each other, similar parts have the same reference numerals, and the following description will be particularly directed to the right half. The upper edges of plates 20, 20 are in close contact with the interior of the wall of drum 6 over their entire length and are essentially in contact with each other along their lower edges. Each plate is provided with a plurality of apertures 24 in a horizontal row near its upper edge through which steam passes on its way to dry steam chamber 16. These apertures are more clearly seen in FIG. 2.

Corrugated plates 22, 22 are fixed over the lower surfaces of plates 20, 20 with the corrugations running along the width of the plates so as to form with plate 20, 20 a number of parallel triangular passages. These are best shown in FIG. 3. It will be noted that one set of triangular passages 26 are spaced and are interspersed with a second set of triangular passages 28 against which lies a body 30 of metal wire mesh constituting an entrainment separator. Inclined wall members 32, 32 are joined to the lower surfaces of plates 20, 20 near the upper edges thereof and overlie the ends of passages 26, 28 closing them off from the main chamber 18 of boiler drum 6.

Walls 32, 32 also lie over the wire mesh entrainment separator 30 so that steam can only enter the entrainment separator through perforated plates 36, 36.

At the lower ends of passages 26 and 28 there is provided a water-collection trough 38 comprised of a horizontal bottom plate 40 and vertical sidewall members 42 and 44, vertical wall member 42 being secured to the lower edge of plate 20 along its entire length while the upper edge of wall member 44 is secured to the crests of corrugated plate 22 opposite to the crests which are secured to plate 20. A further V-shaped trough 46 having side wing members 48 and 50 has wing member 50 secured to corrugated plate 22 along its entire length at its junction with side plate 44. Thus the bottom side of the chamber containing wire mesh entrainment separator 30 and the triangular passages 26 and 28 are entirely separated from chamber 18 except through the apertures in plate 36.

The ends of the chambers containing the wire mesh entrainment filter and the water-collection troughs 38, 46 are closed off from the main chamber 18 by end plates 52, one of which is shown in FIG. 2. Also, though not so shown in this figure, it is desirable that end plates 52 be removable to provide access to the chamber containing the wire mesh entrainment filter through manhole 14 should it be necessary, with the passage of time, to replace such filter material.

Each of the water-collection troughs 38, 46 are provided with a number of drain tubes 56 extending through and sealed to the bottom of the troughs and also extending downwardly well below the surface of the water within the boiler. Thus water collected in the collection troughs during the action of the entrainment separator is returned to the water supply within the boiler well below the surface of the water line.

In order to secure the outer wings 48 of the V-shaped collection troughs 46 in place and increase the rigidity of the entire structure a number of connection straps 58 may be welded or otherwise secured to wing 48 and to plate 36.

Since mixed water and steam may enter drum 6 from water tubes 8 with considerable velocity I have provided an additional perforated baffle plate 60 lying over but spaced from the ends of water tubes 8. Large slugs of water and steam mixed coming out of water tubes 8 tend to be broken up by the action of the perforations in baffle plate 60, the water flowing back to join water within drum 6 and the steam passing upwardly on its route to outlet 10.

I have also provided a pair of spaced parallel perforated plates 62, 64 lying parallel to the surface of the water in the boiler drum 6 and closely above it. Perforated baffles 60, 62, 64 are secured in place within drum 6 by being bolted or otherwise secured to angle irons 66 and 68 arranged longitudinally along the interior of drum 6 and welded or otherwise secured thereto.

Now, by referring particularly to FIGS. 3 and 4 it will be seen that the mixed steam and water containing dissolved solids rises from the water within drum 6 and passes along a path denoted by arrows A through the apertures in plate 36 and along a vertically inclined path, as shown by arrows B, through the wire mesh entrainment separator 38. Water collected on the wire mesh tends to flow more or less vertically downward until it strikes wall 50 and is collected in trough 46 and returned by tube 56 to beneath the water level in the boiler drum. The vertical flow of water in the steel mesh is not as much impeded by the flow of steam at an angle thereto as it would be if the steam and water paths were parallel but in opposite directions.

After the steam has passed through wire mesh filter 30 it enters triangular passages 28 formed by corrugated plate 22 and passes downwardly along those passages as shown by the crossed circles in FIG. 3 and the dotted line C in FIG. 4.

At the bottom end of passages 28 the steam sharply reverses direction and passes upwardly through triangular passages 30 as shown by the solid arrow D in FIG. 4 and the dotted circles in FIG. 3. The sharp change in direction and the relatively high velocity of the steam at the lower ends of the passages tends to throw off any remaining water which is then collected in trough 38 from whence it is returned to beneath the surface of the water in drum 6 by condensate return tubes 56. Thereafter the steam which is now dry and clean passes through apertures 24 in plate 20, as shown by arrow E, into dry steam chamber 16 from whence it passes out of the boiler through outlet 10.

While I have particularly described one embodiment of my invention, it should be understood that my invention is not limited thereto but that variations within the scope of the claims appended hereto may be made.

I claim as my invention:

1. In a steam generating apparatus having a drum containing water and steam, a steam outlet at the top of said drum and a number of riser tubes entering the lower portion of said drum; means for cleaning and drying steam in said drum including a first elongated wall member extending along the length of said drum and lying arranged at an angle to the vertical, the upper edge of said wall lying against the interior of the wall of said drum; a corrugated baffle plate attached over the lower side of said first wall forming with said wall a number of spaced parallel inclined steam riser passages, apertures through said first wall near the upper end of each of said riser passages, a closure at the end of said riser passages; the lower sides of said corrugated baffle plate also forming a plurality of inclined parallel downwardly directed steam passages interspersed with said first-mentioned steam riser; means forming a steam entrance chamber abutting said corrugated plate, said chamber being filled with a wire mesh material and being tilted at an angle to the vertical so that steam flows therethrough at an acute angle to the direction of flow of water through said mesh and means along the lower edge of said inclined plate and said chamber for collecting water and solids removed from said steam.

2. A steam generating apparatus as set forth in claim 1 in which said chamber is formed of a perforated baffle plate lying parallel to and spaced from said corrugated plate and top and bottom walls joining said corrugated plate and perforated baffle plate.

3. A steam generating apparatus as set forth in claim 2, said collecting means including a first trough member having a bottom wall and side walls, the upper edge of one side wall being joined to the lower edge of said inclined plate, and the upper edge of the other of said side walls being joined to said corrugated plate, and condensate drum tubes extending from the bottom of said first trough member to beneath the water surface of said drum.

4. A steam generating apparatus as set forth in claim 3, said collecting means including a second trough member having a pair of side walls, one of which is the bottom wall of said chamber, and the other of which extends beneath said perforated plate in spaced relation thereto, and condensate drum tubes extending from the bottom of said second trough member to beneath the water surface of said drum.

5. A steam generating apparatus as set forth in claim 1 wherein a pair of elongated wall members are arranged in a generally V-shaped configuration to form a dry steam chamber beneath said steam outlet.

6. A steam generating apparatus as set forth in claim 2 wherein a pair of elongated wall members are arranged in a generally V-shaped configuration to form a dry steam chamber beneath said steam outlet.

7. A steam generating apparatus as set forth in claim 3 wherein a pair of elongated wall members are arranged in a generally V-shaped configuration to form a dry steam chamber beneath said steam outlet.

8. A steam generating apparatus as set forth in claim 4 wherein a pair of elongated wall members are arranged in a generally V-shaped configuration to form a dry steam chamber beneath said steam outlet.

9. A steam generating apparatus as set forth in claim 8 in which said drum is further provided with spaced parallel perforated baffle plates horizontally disposed over the water level in said drum.

10. A steam generating apparatus as set forth in claim 9 in which said drum is further provided with a perforated box baffle over said steam riser tubes.

References Cited

UNITED STATES PATENTS

| 2,206,336 | 7/1940 | Rowand et al. | 122—488 |
| 2,256,115 | 9/1941 | Hobbs | 122—491 |
| 2,286,207 | 6/1942 | Keenan et al. | 122—459 |

KENNETH W. SPRAGUE, *Primary Examiner.*